US009863621B2

(12) United States Patent
Dai et al.

(10) Patent No.: US 9,863,621 B2
(45) Date of Patent: Jan. 9, 2018

(54) VEHICLE TRUNK LIGHTING SYSTEM

(71) Applicant: Ford Global Technologies, LLC, Dearborn, MI (US)

(72) Inventors: Alec Dai, Nanjing (CN); Kadin Zhang, Nanjing (CN); Fernando Zhao, Nanjing (CN); Jonas Liu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/289,373

(22) Filed: Oct. 10, 2016

(65) Prior Publication Data

US 2017/0113606 A1  Apr. 27, 2017

(30) Foreign Application Priority Data

Oct. 22, 2015 (CN) .......................... 2015 1 0691517

(51) Int. Cl.
  *F21V 23/04* (2006.01)
  *B62D 25/12* (2006.01)
  *B60Q 3/30* (2017.01)
(52) U.S. Cl.
  CPC ............... *F21V 23/04* (2013.01); *B60Q 3/30* (2017.02); *B62D 25/12* (2013.01)
(58) Field of Classification Search
  CPC .. F21V 23/04; B60C 3/30; B60C 3/82; B62D 25/12
  USPC ........................................................ 362/496
  See application file for complete search history.

(56) References Cited

U.S. PATENT DOCUMENTS 2,891,235 A * 6/1959 Halpert .................... B60Q 3/30
                                                  191/12.2 R
3,582,639 A * 6/1971 Chamberlain ........... B60Q 3/30
                                                  362/370
4,054,789 A * 10/1977 Romanelli ............... B60Q 1/52
                                                  362/464

(Continued)

FOREIGN PATENT DOCUMENTS

CN        203840598 U     9/2014
DE   10 2012 022534   *  5/2014

(Continued)

OTHER PUBLICATIONS

Google translation of DE102012022534 dated Aug. 2, 2017; pp. 1-9.*

(Continued)

*Primary Examiner* — Laura Tso
(74) *Attorney, Agent, or Firm* — Vichit Chea; Price Heneveld LLP

(57) ABSTRACT

A trunk lighting system of a vehicle with a vehicle ceiling, where the trunk lighting system includes a trunk floor panel positioned in a trunk of the vehicle and movable between a first position and a second position, the trunk floor panel being closer to the vehicle ceiling at the second position than at the first position. The trunk lighting system has a lighting device, and a switch connected to the lighting device and to trigger a second lighting output from the lighting device when the trunk floor is at the second position, the second lighting output being greater than a first lighting output from the lighting device when the trunk floor panel is at the first position.

18 Claims, 3 Drawing Sheets

(56) References Cited

U.S. PATENT DOCUMENTS

| | | | | |
|---|---|---|---|---|
| 5,580,153 A | * | 12/1996 | Motz | B60Q 3/30 |
| | | | | 362/496 |
| 7,705,720 B2 | * | 4/2010 | Jachmann | B60Q 7/00 |
| | | | | 340/468 |

FOREIGN PATENT DOCUMENTS

| | | | |
|---|---|---|---|
| DE | 10 2015 117858 | * | 4/2016 |
| WO | WO 2010/119196 | * | 10/2010 |

OTHER PUBLICATIONS

Google translation of DE102015117858 dated Aug. 2, 2017; pp. 1-14.*

* cited by examiner

US 9,863,621 B2

VEHICLE TRUNK LIGHTING SYSTEM

FIELD OF THE INVENTION

The present invention generally relates to vehicle trunk lighting system, and more particularly to a lighting system for a vehicle trunk having a movable trunk floor panel.

BACKGROUND OF THE INVENTION

Vehicle trunks are often equipped with lighting sources that generate illumination to provide customers with ease of using the vehicle trunk in the dark or at certain occasions when lighting is not sufficient. For example, China Patent No. CN203840598 discloses a vehicle trunk illumination system that generally includes a wireless energy emission unit and a wireless energy receiving unit, where the wireless energy emission unit includes a control chip and a transmitting coil. The control chip is connected to the transmitting coil via a driving circuit and a half-bridge transmitting circuit sequentially, and the wireless energy receiving unit includes a receiving coil to receive energy signal sent by the transmitting coil and a lamp is in serial connection with the receiving coil.

SUMMARY OF THE INVENTION

According to one aspect of the present invention, a trunk lighting system of a vehicle with a vehicle ceiling is provided. The trunk lighting system includes a trunk floor panel positioned in a trunk of the vehicle and movable between a first position and a second position. The trunk floor panel is closer to the vehicle ceiling at the second position than at the first position. The trunk lighting system also includes a lighting device, and a switch connected to the lighting device and to trigger a second lighting output from the lighting device when the trunk floor is at the second position. The second lighting output is greater than a first lighting output from the lighting device when the trunk floor panel is at the first position.

According to another aspect of the present invention, a vehicle trunk lighting system includes a trunk floor panel positioned in a trunk of the vehicle and movable between a closed position and an open position, a lighting device, and a switch for activating a lighting output from the lighting device when the trunk floor panel is in the open position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1A, 1B:
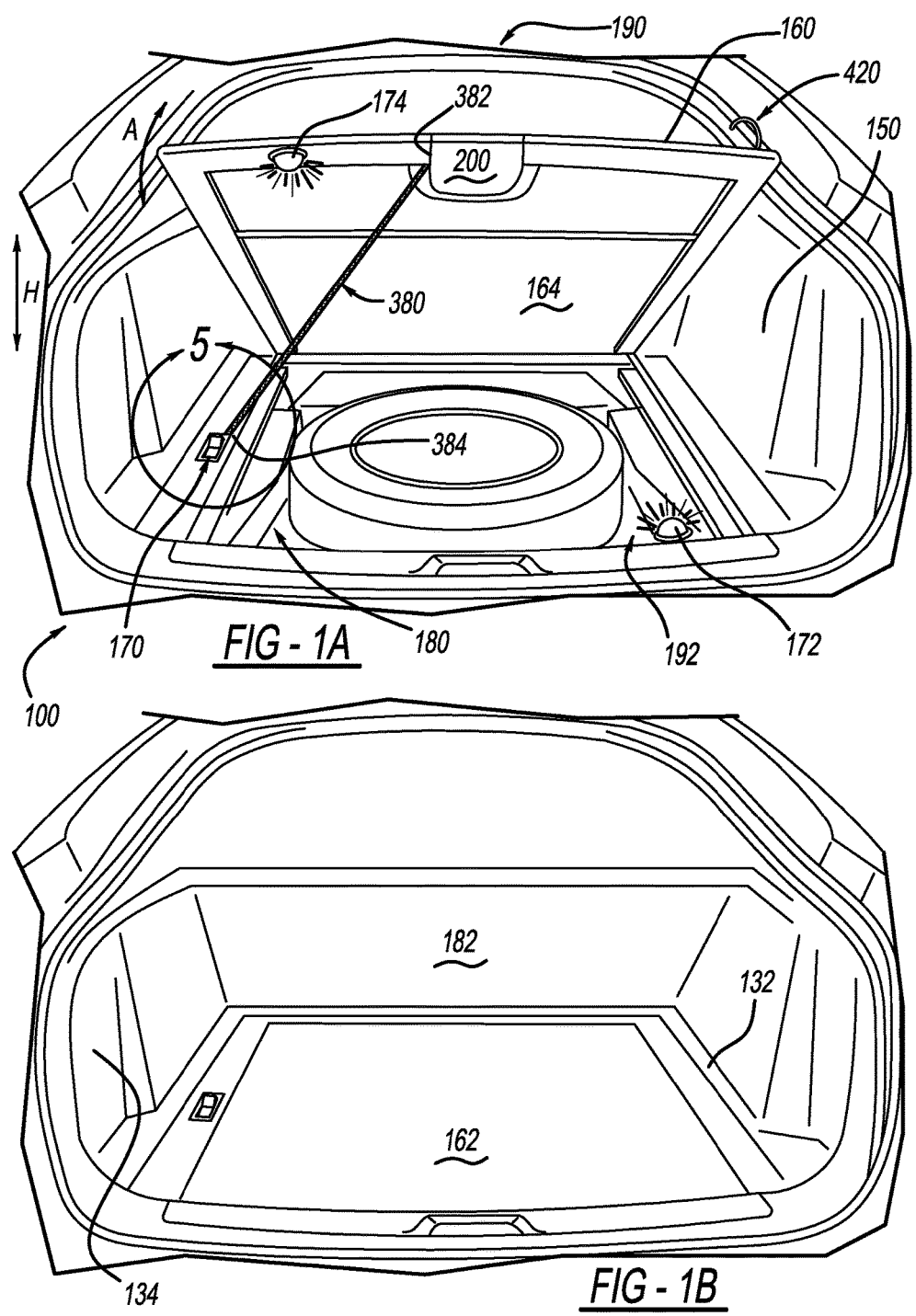
FIG. 1A is a rear view of a vehicle having a vehicle trunk according to one or more embodiments at a second position.
FIG. 1B is a rear view of the vehicle further illustrating the vehicle trunk of FIG. 1A at a first position.

As required, particular embodiments of the present invention are disclosed herein; however, it is appreciated that the disclosed embodiments are merely exemplary and may be variable and modifiable. The drawings referenced herein are schematic and may be enlarged or minimized, and associated views thereof are not necessarily drawn to scale. As referenced in the drawing figures, the same reference numerals may be used herein to refer to the same parameters and components or their similar modifications and alternatives. These parameters and components are included as examples and are not meant to be limiting. Accordingly, particular structures and functional details as disclosed herein are not limiting, and are presented as representative basis via which those in the technical area may be guided to carry out the present invention in various forms.

The trunk of a vehicle often includes storage space for certain emergency necessitates such as spare tires, warning triangles and Jacks. More specifically, trunk division panels may be employed to partition the trunk space, for instance, the trunk space may be divided into an upper portion and a lower portion such that large items such as a spare tire may be stored in the lower or bottom storage space, while the upper space may be used for other purposes. When the use of the spare tire is needed, a user (e.g., driver or assistant) may move or lift the trunk division panel to detach the spare tire from the trunk. However, when lighting is not sufficient, particularly when the trunk division panel is lifted up for the retrieval of the spare tire, available lighting devices may be blocked by the trunk division panel as being lifted up such that the user may not be able to easily disengage the spare tire for use.

Aside from the items mentioned above, the trunk space may be utilized in a variety of other manners, for instance, one may store other goods or tooling in the bottom space for travel. When lighting is not sufficient, for instance, in the evenings or particularly when camping, the user may experience insufficient lighting conditions. Moreover, with technology advancement, development and use of the trunk space are proceeding further, and accordingly users' desire for better lighting may be in further demand. The inventor(s) of the present invention acknowledge limitations of certain existing technologies and appreciate desirable enhancement in lighting, by providing a trunk lighting assembly and system according to one or more embodiments so as to realize better lighting and improved user experience.

Referring to FIGS. 1A-4, a vehicle 100, such as a wheeled motor vehicle, is illustrated having a trunk 150 according to one or more embodiments. The vehicle 100 includes a vehicle ceiling 190 and the trunk 150 at its rear. The trunk 150 includes a trunk floor panel 160 that may move between a first position such as a closed position illustratively depicted in FIG. 1B and a second position such as an open position as illustratively depicted in FIG. 1A. Along a vehicle height direction H, the trunk floor panel 160 separates the trunk 150 into an upper compartment 182 and an underside compartment 180. The trunk floor panel 160 may pivot about an axis at its front end relative to the underside compartment 180 along a direction A. Again along the vehicle height direction H, the trunk floor panel 160 is positioned between the vehicle ceiling 190 and a bottom floor 192 of the underside trunk compartment 180.

Figure 2:
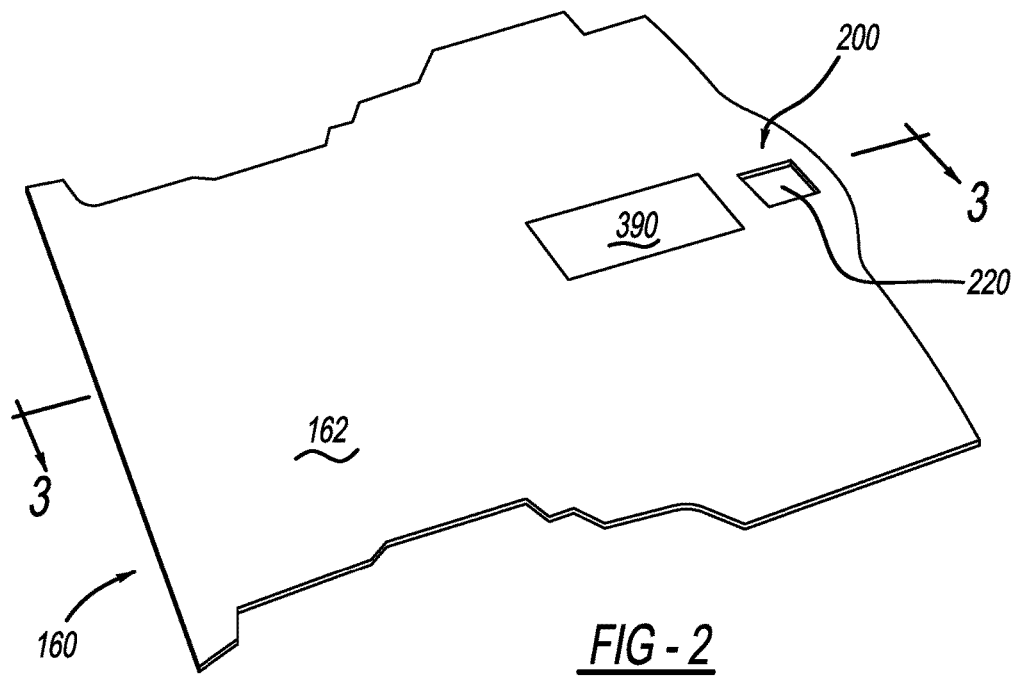
FIG. 2 is an upper perspective view of a trunk floor panel that may be employed in the vehicle trunk shown in FIG. 1A and FIG. 1B.

With particular reference to FIG. 2, the trunk floor panel 160 includes an upper surface 162 that is relatively closer to the vehicle ceiling 190 and an opposing lower surface 164. When the trunk floor panel 160 is at the first closed position such as the position illustratively depicted in FIG. 1B, the trunk floor panel 160 may be used as a load-carrying floor to support items of the day, such as groceries, handbags and outer jackets, where the upper surface 162 of the trunk floor panel 160 may be in direct contact with or otherwise support the load of these items and any packaging materials thereof.

Figure 4:
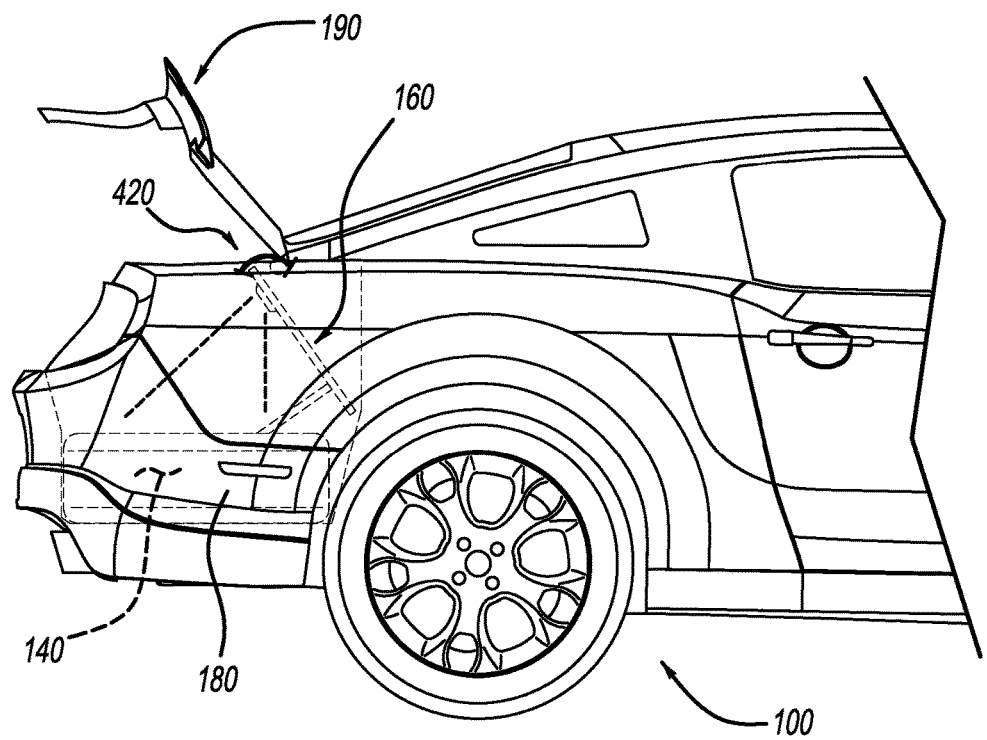
FIG. 4 is a side view of the rear portion of the vehicle showing an alternative perspective view of the trunk shown in FIG. 1A and FIG. 1B.

Again with further reference to FIG. 2 and FIG. 4, the lower surface 164 of the trunk floor panel 160 may define a ceiling or a top portion of the underside compartment 180. Suitable items as mentioned herein or elsewhere such as spare tires 140 and tools may be stored in the underside compartment 180. Aside from these everyday items, other items or tools per certain particular needs may be stored in the underside compartment 180 as well.

In one or more embodiments, the above-referenced first position and second position may respectively include the extreme positions of the trunk floor panel 160, for instance, the closed position as illustratively depicted in FIG. 1B, and the open position as illustratively depicted in FIG. 1A. However, it is appreciated that the first and second positions may include variable positions so long as the trunk floor panel 160 is relatively closer to the vehicle ceiling 190 at the second position relative to the first position. In other words, the trunk floor panel 160 at the raised second position is relatively closer to be completely open than at the lowered first position.

Referring back to FIG. 1A and further in view of FIG. 4, a lighting device 172 may be positioned within the underside trunk compartment 180, and in particular on the bottom floor 192 of the underside trunk compartment 180 to provide lighting so as to assist with access and item retrieval from the underside trunk compartment 180. The lighting device 172 does not have to be limited to any particular position as long as the lighting device 172 or at least its light-emitting surface is located within the underside trunk compartment 180. For instance, a lighting device 174 may be positioned on the underside 164 of the trunk floor panel 160, such that the lighting device 174 is not readily visible when the trunk floor panel 160 is at the first position such as the position illustratively depicted in FIG. 1B, and becomes visible when the trunk floor panel 160 is at the second position such as the position illustratively depicted in FIG. 1A. One or more of the lighting devices 172, 174 may be employed, at any suitable locations within the underside trunk compartment 180.

Referring back again to FIG. 1A and FIG. 1B, a switch 170 may also be provided in operational connection with the lighting devices 172, 174. The switch 170 may be provided anywhere suitable within the vehicle 100 and in particular the trunk 150. For ease of access, the switch 170 may be provided anywhere visible of the upper trunk compartment 182, and in particular on a floor edge 132 and/or on a trunk side wall 134 thereof, as illustratively depicted in FIG. 1B. The design is believed to be advantageous in that the user may easily locate the switch 170 via any existing lighting available from the upper compartment 182, and then to activate lighting within the underside trunk compartment 180 via the lighting device 172 and/or 174 which are in operational connection to the switch 170.

In one or more embodiments, the trunk floor panel 160 may optionally include a handle area 200 as illustratively depicted in FIG. 1A and FIG. 2, and the lighting device and associated switch may be provided within the handle area 200. The handle area 200 may include a graspable opening as a handle, and the handle may be of any suitable forms and configurations.

Figure 3:
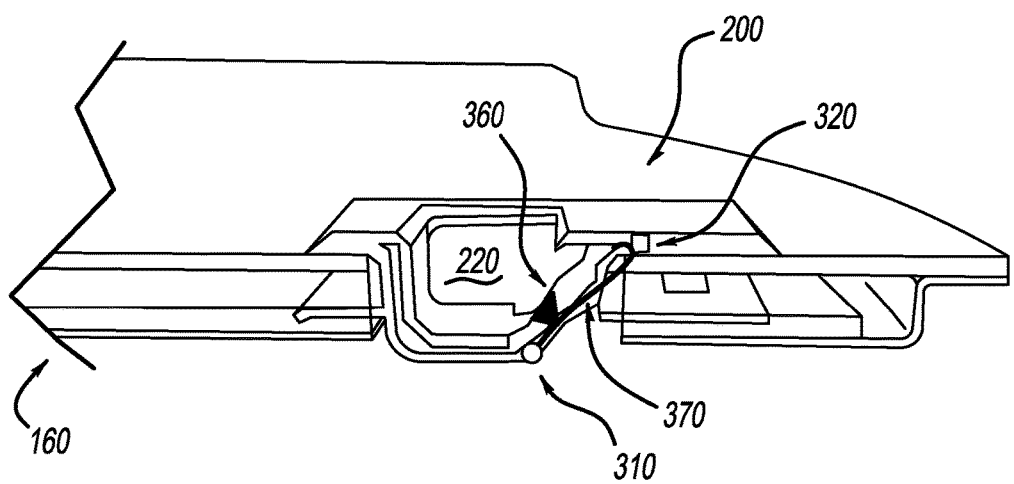
FIG. 3 is a cross-sectional view of the trunk floor panel taken through line in FIG. 2.

FIG. 3 illustratively depicts a partially enlarged cross-sectional view of the handle area 200 referenced in FIG. 1A and FIG. 2. As an alternative to the light devices 172, 174, a lighting device 310 may be provided within the handle area 200. Similarly, and as an alternative to the switch 170, a switch 360 may also be provided within the handle area 200 in operational connection with the light device 310. The lighting device 310 is shown positioned in the underside compartment 180 defined by the trunk floor panel 160 as a movable ceiling. As shown in FIG. 3, and in another one or more non-limiting embodiments, at least a portion of the switch 360 which is to activate or control the illumination intensity of the lighting device 310 may be positioned in the handle area 200, and electrical connection across the switch to power the lighting device 310 may be established by grabbing the handle area 200 itself to trigger the switch 360.

In the embodiments where the switch 360 is also positioned in the handle area 200, the switch 360 may be neatly arranged inside of any suitable cavities available from the handle area 200 which is otherwise designed for hand or finger access. Accordingly improved space efficiency and aesthetic feel may further be provided.

In the embodiments as shown in FIG. 1A, FIG. 2 and FIG. 3, the trunk floor panel 160 includes the handle area 200 to facilitate operation by the user. The handle 220 in the handle area 200 may vary in designs or positions according to other embodiments as long as it functions to provide ease for the user to grab and lift the trunk floor panel 160. Those who are familiar with the technical area may make modifications while still obtaining benefits from one or more embodiments of the present invention.

In one or more embodiments, the above-referenced lighting devices 172, 174, 310 may be connected to the trunk 150 and particularly the underside compartment 180 via any suitable methods, such as one or more of traditional electrical connections, communication connections and physical connections.

The lighting devices 172, 174, 310 may be powered by any suitable methods, such as electrical power provided by the vehicle system or provided by external devices independent of the vehicle 100 such as disposable batteries. For instance, and as shown in FIG. 3, a power source 320 is provided to be connected to the lighting device 310 via a circuit 370, and the power source 320 may be a disposable battery. Independent power supply is not limited by whether the vehicle is at its operating conditions, is with simple electrical connection, and does not necessarily need to involve the vehicle power main, and therefore cost efficiencies may be achieved, particularly also because replacement of disposable batteries may be easily accomplished.

In one or more embodiments, the switch 170, 360 may be configured to effect a second lighting output from the lighting devices 172, 174 and 310 when the trunk floor panel 160 is moved to the second position, the second lighting output being greater than a first lighting output from the lighting devices 172, 174, 310 when the trunk floor panel 160 is at the first position. In a non-limiting example, the intensity of the first lighting output by the lighting device is zero while the trunk floor panel 160 is at the first position. In other words, the lighting device 310 is not activated while the trunk floor panel 160 is at the first position. And the intensity of the second lighting output by the lighting devices 172, 174, 310 is greater than zero while the trunk floor panel 160 is at the second position. In other words, the lighting devices 172, 174, 310 are activated when the trunk floor panel 160 is opened. The lighting intensity or strength as mentioned herein may refer to an amount of visible light received per unit area according to the law of physics, and any suitable lighting intensity testing devices available on the market may be employed to implement the test. With the above mentioned settings, the lighting devices 172, 174 and 310 are not activated when the underside compartment 180 is not needed so as to preserve energy. When needed, the positional change of the trunk floor panel 160 activates one or more of the lighting devices 172, 174 and 310 to more effectively provide illumination of the underside compartment so as to ease the process of item retrieval and also to relieve the user of troubles associated with locating a switch under insufficient lighting.

In one or more embodiments, switches 170, 360 for connection to the lighting devices 172, 174 and 310 may be trigger switches of any types, with non-limiting examples thereof including capacitive switches, micro switches, proximity switches, tension triggered switches, infrared switches, and any combinations thereof, with no particular limitation in configuration, and those who are familiar with the technology may obtain various modifications as desirable.

In a non-limiting embodiment and in view of FIG. 1A, FIG. 1B and FIG. 3, the switch 170 and/or 360 may be a switch operable between a first position such as an OFF position and a second position such as an ON position based upon changes in physical location or relative distance of the trunk door panel 160 within the trunk storage 150. For instance, the switch 170, 360 are not triggered when the trunk floor panel 160 is at its closed position, and are triggered by mechanical forces when the trunk floor panel 160 moves relative to the interior trim in the trunk 150 such as the floor edge 132 and the trunk side wall 134. For this design, the switch 170, 360 may be a micro switch in any suitable form, shape and operational variations.

Figure 5:
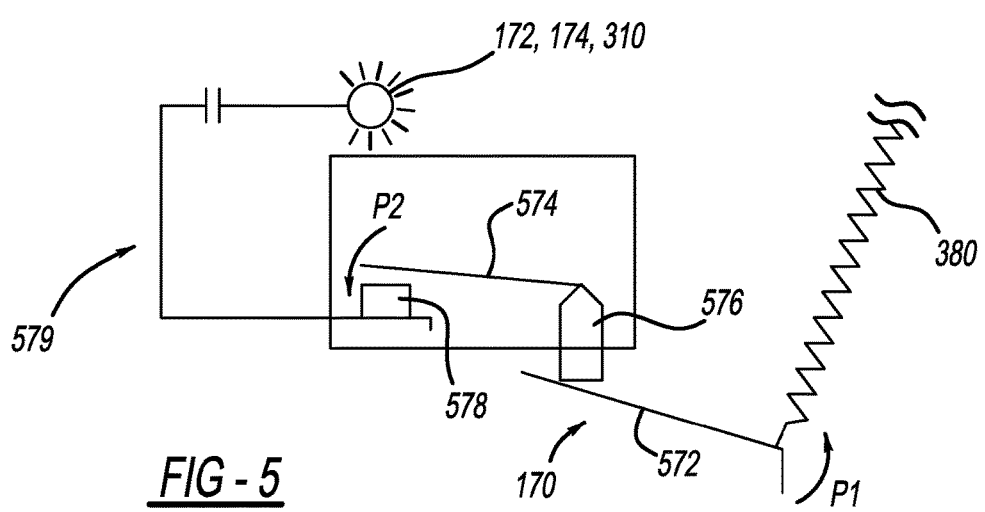
FIG. 5 illustratively depicts an operational view of a switch that may be employed in the truck lighting system shown in FIG. 1A and FIG. 1B.

FIG. 5 illustratively depicts in a non-limiting fashion an operational diagram of a connection between the switch 170 and a tension-charged rope 380. As the trunk floor panel 160 is being lifted up along direction A from the second position to the first position, the tension-charged rope 380 moves along with the trunk floor panel 160. With this movement, a lever 572 of the switch 170 moves upward along direction P1 via pivoting about a spacer 576. Accordingly then a bar 574 which connects the spacer 576 causes an electric circuit 579 to be in a closed loop by touching down along direction P2 upon a connection button 578. This non-limiting design provides a way via which an electrical closed circuit may be established to turn on the lighting within the underside compartment 180 via a direct mechanical connection triggered by the physical movement of the trunk floor panel 160.

In a non-limiting fashion, the switch 170, 360 may be turned on or off via its mechanical connection to the tension-charged rope 380 illustratively depicted in FIG. 1A. The tension-charged rope 380 may be connected at one end 382 to the trunk floor panel 160 and at another end 384 to a predetermined location of the vehicle 100 other than the trunk floor panel 160. The pre-determined location may be any location stationary to the vehicle 100 such that tension of the tension-charged rope 380 changes as the trunk floor panel 160 moves between the first and second positions. Accordingly the tension change translates to an ON or an OFF operation at the switch. Non-limiting examples of the predetermined location to which the tension-charged rope 380 is connected include any suitable interior trim such as the trunk side wall 134, structural edges such as the truck floor edge 132, and hooks or cavities of the vehicle 100.

With further reference to FIG. 1A, the tension-charged rope 380 may at its one end 382 be connected to the handle portion 200. Accordingly, a second tension input is imparted onto the switch when the trunk floor panel 160 is at the second position, a first tension input is imparted onto the switch when the trunk floor panel 160 is at the first position, and the first tension input differs from the second tension input. In other words, the tension-charged rope 380 triggers the switch by sensing the tension and hence the movement of the trunk floor panel 160. Without wanting to be limited to any particular theory, this configuration is believed to be beneficial in that the one end of the tension-charged rope 380 is expected to travel a distance that is closely representative of the movement of the trunk floor panel 160. Accordingly, tension change of the tension-charged rope 380 and hence the operational position of the switch correlate with power and strength of the light emitted from the lighting device.

Examples of switches are provided herein above and it is appreciated that switches as a fairly standard component may be chosen by those skilled in the technology and the installation position thereof may be varied according to different requirements. For instance, the switch may at least be partially located within the handle area 200, on the trunk floor panel 160 or the edge thereof, or on the interior trim of the trunk, and the switch may be triggered by the relative movement of the trunk floor panel 160 between the closed position and the open position. False triggering may be avoided when circuit activation is effectuated by the positional change of the trunk floor panel 160, and moreover, triggering profile of the switch may be configured such that the switch is not triggered until the positional change is above a predetermined value.

In one or more non-limiting examples, other condition switches may be added into the circuit 370 of the lighting device 310, for instance, light sensitive components and switch components may be employed such that the circuit 370 is enabled to provide lighting only under certain weak-lighting conditions. In another example, infrared sensor and switch components may be employed such that the circuit 370 is enabled to provide lighting only when a person is detected in nearby presence. In yet another example, the switch 360 is a capacitive delay switch and the delay may be set according to regular usage requirements, for instance, a delay of 3 minutes or a delay of 5 minutes.

The lighting devices 172, 174 and 310 may include any lighting devices such as traditional lighting bulbs or LED modules. The lighting devices 172, 174 and 310 may be packaged in a module or wrapped by light-transmitting material layers, and then be mounted onto or within the trunk floor panel 160 via any suitable manners, including but not limited to adhesives, clips, detachable Velcro® connectors, clutches, hooks and loop connector sets.

When the trunk floor panel 160 is at the open position shown in FIGS. 1A-4, a supporting shaft 420 may be employed to help maintain the trunk floor panel 160 at the open position. In other embodiments, other holders/connectors may be employed to keep the trunk floor panel 160 at the open position. This configuration may be particularly beneficial in that the tension-charged rope 380 may readily be integrated into the support shaft 420 such that the one or more lighting devices 172, 174, 310 may be activated upon the support shaft 420 being changed in its position.

FIG. 4 depicts an alternative perspective view of the vehicle trunk reflecting one or more embodiments. As shown, the trunk 150 of the vehicle 100 is open, particularly the trunk floor panel 160 of the trunk 150 is at an open position and is supported by the supporting shaft 420, the lighting device 310 is switched on by any suitable method mentioned herein to illuminate the underside compartment 180, so as to ease operation by the user, for instance, in retrieving the spare tire or any other tools via button-loosening. After the use, the trunk floor panel 160 returns to the closed position and a switch-off is triggered to turn off the lighting device 310.

In one or more embodiments, and further in view of FIG. 2, the handle area 200 may further include a light-transmitting area 390, to optionally filter through the light emitted from the lighting devices 172, 174, 310. Optionally also, at least a portion of the light-transmitting area 390 may be included in the handle area 200 or that at least a portion of the handle area 200 is included in the light-transmitting area 390 to provide additional space efficiency and enhanced versatility. This design is particularly useful when the user may turn on the switch 170 while the trunk floor panel 160 is still at the first position such as the position illustratively depicted in FIG. 1B, and obtain a quick glance of any item such as the spare tire 140 before taking the effort to move the trunk floor panel 160 to the second position, which may take unwanted time and effort particularly when the trunk floor panel 160 is locked for security reasons.

FIG. 1A through FIG. 5 illustratively depict the vehicle trunk lighting system, while it is appreciated that any suitable lighting devices and switches in various configurations and types may be employed, and that the lighting device and the switch do not have to be positioned in the handle area 200 and may vary as needed. The lighting devices according to one or more embodiments may provide users with convenience via their simple structures and low cost. Through the availability of lighting enabled via switch triggering in response to the movement of the trunk floor panel, the user is relieved of troubles in searching in dark for an on/off button, for a lighting device, or items otherwise hidden underneath the trunk floor panel, particularly when spare tire replacement is desirable in which sufficient lighting may be necessary for steps such as loosening up screws or buttons. It is appreciated that the disclosed lighting system may be applied in other field areas where lighting is needed.

The following claims particularly point out certain combinations and sub-combinations believed to be novel and nonobvious. These claims may refer to "an" element or "a first" element or any equivalent thereof. Such claims are constructed to include one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, the same, or different in scope to the original claims, also are constructed as being within the subject matter of the present disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trunk lighting system of a vehicle with a vehicle ceiling, comprising:
 a trunk floor panel positioned in a trunk of the vehicle and movable between a first position and a second position, the trunk floor panel being closer to the vehicle ceiling at the second position than at the first position;
 a lighting device; and
 a switch connected to the lighting device and positioned to activate a second lighting output from the lighting device when the trunk floor panel is at the second position, the second lighting output being greater than a first lighting output from the lighting device when the trunk floor panel is at the first position, wherein the switch is tension charged such that a second tension input is imparted onto the switch when the trunk floor panel is at the second position, a first tension input is imparted onto the switch when the trunk floor panel is at the first position, and the first tension input differs from the second tension input.

2. The trunk lighting system of claim 1, wherein the lighting device is positioned within an underside compartment defined by the trunk floor panel as a movable ceiling.

3. The trunk lighting system of claim 2, wherein the trunk floor panel includes thereupon a handle area and at least a portion of the switch and the lighting device is positioned within the handle area.

4. The trunk lighting system of claim 1, wherein the trunk floor panel includes a light-transmitting surface differing in material from another portion of the trunk floor panel.

5. The trunk lighting system of claim 1, wherein the trunk floor panel is connected to the switch via a tension-translating shaft.

6. The trunk lighting system of claim 5, wherein the tension-translating shaft includes a spring unit.

7. The trunk lighting system of claim 1, wherein the switch is a mechanical switch positioned at an edge of the trunk floor panel, and the switch is to be triggered by movement of the edge relative to an interior trim of the trunk.

8. The trunk lighting system of claim 1, wherein the switch is a micro switch.

9. The trunk lighting system of claim 1, wherein the lighting device is positioned on an underside surface of the trunk floor panel.

10. The trunk lighting system of claim 1, further comprising a disposable battery electrically connected to the lighting device.

11. A vehicle trunk lighting system, comprising:
 a trunk floor panel positioned in a vehicle trunk and movable between closed and open positions;
 a lighting device; and
 a tension charged switch imparted with a second tension input for activating the lighting device when the trunk floor panel is in the open position, wherein a different first tension input is impacted onto the switch when the trunk floor panel is in the closed position.

12. The trunk lighting system of claim 11, wherein the lighting device is activated to generate a second lighting output when the trunk floor panel is in the open position, wherein the second lighting output is greater than a first lighting output from the lighting device when the trunk floor panel is at the closed position.

13. The trunk lighting system of claim 11, wherein the lighting device is positioned within an underside compartment defined by the trunk floor panel as a movable ceiling.

14. The trunk lighting system of claim 13, wherein the trunk floor panel includes thereupon a handle area and at least a portion of the switch and the lighting device is positioned within the handle area.

15. The trunk lighting system of claim 11, wherein the trunk floor panel includes a light-transmitting surface differing in material from another portion of the trunk floor panel.

16. The trunk lighting system of claim 11, wherein the trunk floor panel is connected to the switch via a tension-translating shaft.

17. The trunk lighting system of claim 16, wherein the tension-translating shaft includes a spring unit.

18. The trunk lighting system of claim 11, wherein the switch is a mechanical switch positioned at an edge of the trunk floor panel, and the switch is to be triggered by movement of the edge relative to an interior trim of the trunk.

* * * * *